April 27, 1943. E. HOCKE 2,317,536
COMBUSTION CHAMBER FOR INTERNAL COMBUSTION ENGINES
Filed March 19, 1940
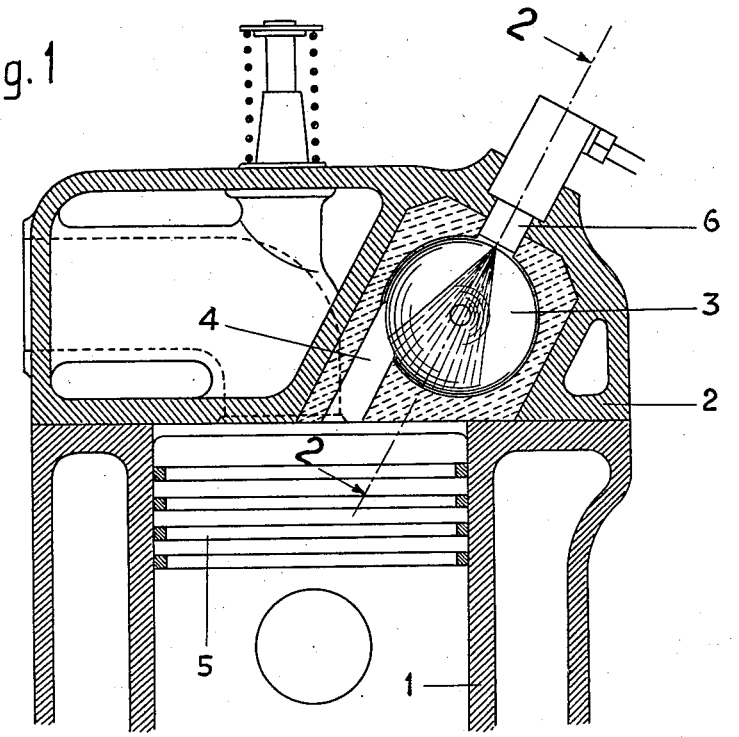
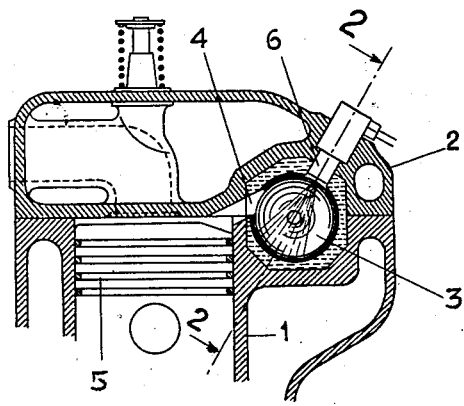
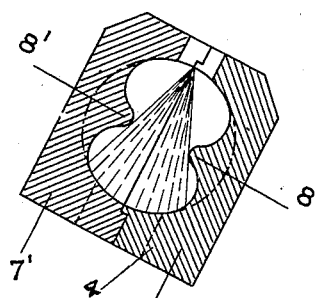
Inventor
Enrico Hocke
by
Atty.

Patented Apr. 27, 1943

2,317,536

UNITED STATES PATENT OFFICE 2,317,536

COMBUSTION CHAMBER FOR INTERNAL COMBUSTION ENGINES

Enrico Hocke, Genoa, Italy; vested in the Alien Property Custodian

Application March 19, 1940, Serial No. 324,876
In Germany April 1, 1939

2 Claims. (Cl. 123—32)

The invention relates to improvements in combustion chambers for internal combustion engines working with liquid fuel in which the ignition of the charging mixture takes place by compression and the combustion chamber in which the combustion is initiated is separated from the compression chamber of the working cylinder.

Most known combustion chambers for engines of this kind are of spherical or cylindrical form and communicate with the compression chamber of the working cylinder by a port which is connected with the combustion chamber in such a manner that the air charge during the compression travel is put in a swirling rotating movement within this chamber. The pulverized liquid fuel is injected within the combustion chamber in the shape of a cone and preferably in the transverse direction with regard to the swirling rotating movement of the air charge.

It is known that in high speed Diesel engines with a combustion chamber in which a swirling rotating movement of the air charge takes place and the fuel is injected within the combustion chamber in the shape of a cone preferably in the transverse direction with regard to the swirling rotating movement of the air charge, to be necessary that the air charge is conveyed in the most complete manner across the cone of the injected fuel in order to reach an intimate mixture between the air and the fuel and prevented the formation of the so called dead zones. It is further necessary that the ignition delay is diminished as much as possible and that the ignition does not take place over a larger mass of fuel but same is only initiated in one or more places and gradually communicated to the rest of the fuel.

According to the present invention which utilises also such a spherical or cylindrical combustion chamber, this chamber is formed by two similar protuberances which are symmetrically and oppositely arranged on the rotating axis of the air charge and project from the walls of the chamber and terminate substantially in pointed ends which latter are quickly brought to incandescence and to the necessary ignition temperature of the fuel. By this feature besides reaching a particular intimate mixture of the air charge with the injected fuel the light fuel particles are projected against the axis of rotation of the air charge and therefore against the incandescent protuberances and thereby brought to the necessary ignition temperature.

The effect of these protuberances is explained more particularly in the following:—

While the enlarged base of the protuberances provocates a perfect mixture between air charge and the fuel, the points during the combustion process are heated to a higher degree than the other parts of the combustion chamber more particularly as same are distinctly projecting towards the inside with regard to the other parts and are not touched like the other parts of the chamber by the air entering in the chamber during the first phase of the compression. During the injection of the fuel one part of the fuel jet, finely broken up within the combustion chamber, is projected almost on a rectilinear path against the axis of rotation of the air charge where the air by compression and especially on account of the incandescent protuberances possesses the highest temperature. These fuel particles are thus brought instantly to the necessary ignition temperature and the ascension initiated while for the other part of the fuel a certain time will be required until it reaches the zone of the highest temperature. After the ignition has been started in one or two places the same is communicated with great speed by radiation and convection to the rest of the mixture.

By the arrangement of the protuberances it is possible to obtain a substantial reduction of the ignition delay and to maintain at a relatively low compression of the air mixture such temperatures in the combustion chamber as will produce an instantaneous initiation of the ignition, this initial ascension being then quickly transmitted to the total remaining fuel quantity in such a manner that the transmission of energy takes places in a perfectly smooth manner without the least knocking. The reduction of the ignition delay is particularly of importance for high speed engines as the interval of time from the moment in which the fuel is introduced to the moment to which the combustion has to take place is a very short one.

By the particular construction of the combustion chamber, according to the invention a perfect combustion of the fuel is obtained and the discharge gases are entirely free from smoke and odour.

A form of embodiment of the invention is illustrated in the accompanying drawing.

Figures 1 and 3 are part sectional views of an internal combustion engine with the improved combustion chamber; the same is situated according to Figure 1 completely in the cover and according to Figure 3 partially in the cover and partially in the cylinder block of the engine.

Figure 2 is a sectional view of the combustion chamber according to line 2—2 of Figures 1 and 3.

In the cover 2 of the working cylinder 1 is arranged as a separate structural body the spherical combustion chamber 3. A port 4 connects the combustion chamber with the working cylinder containing the piston 5. The combustion chamber 3 could also be manufactured in one piece with the cover 2 carrying the fuel nozzle 6. It is however more advantageous to insert the combustion chamber as a separate structural body in the cover, in order to manufacture this chamber with exact and smooth surfaces which present to the rotating air charge the smallest possible friction. This form of manufacture is preferred as changing of the combustion chamber can be made without requiring the substitution of the cover, whenever the inner surface of the chamber or of the port require such substitution. By constructing the combustion chamber as a separate structural body it is also possible to manufacture it of material which has a higher resistance than cast iron and particularly more resistance against elevated temperatures.

As shown in Figure 2 the combustion chamber is in two parts 7, 7' the division surface of which is situated normal to the direction of the axis of rotation of the circle by which the chamber is generated and which passes through the axis of the working cylinder or is parallel to it. On the inside of the combustion chamber oppositely arranged are the two ignition protuberances 8, 8' terminating in pointed ends.

The protuberances are of a symmetrical construction and are situated on the geometrical axis around which the air charge is rotated so that the outer finely distributed fuel particles of the injected fuel cone are quickly ignited on contact with the incandescent points.

In the known spherical and cylindrical combustion chambers the angle of the injected fuel cone is between 30° and 45°. Also for the chamber of the present invention such an injection cone can be utilised.

It has been established that in order to obtain the best effect and the highest efficiency of the engine it is advantageous to provide besides the special construction of the combustion chamber also a determined relation of its dimensions to those of the diameter of the cylinder. The biggest diameter of the spherical combustion chamber is conveniently between the limits 0.48 to 0.36 times the diameter of the cylinder and the biggest width of the chamber measured parallel to the axis of rotation is between 0.65 to 0.85 times the greatest diameter of the combustion chamber.

I claim:

1. In an internal combustion engine of the liquid fuel compression ignition type, a combustion chamber shaped to permit a rotating or swirling charge of air, and a fuel ignition crossing the path of the whirling air, the interior wall of the chamber being formed with inwardly extending substantially pointed areas, arranged opposite one another on the axis of the rotating air charge and of a volume to cause them to become substantially incandescent under the heat of the charge to initiate ignition of subsequent charges.

2. In an internal combustion engine of the liquid fuel compression type, a combustion chamber having an inner spherical like form, an air charging conduct leading thereto to cause rotating or swirling of the air delivered within said chamber, means for delivering fuel across the path of the whirling air, the interior wall of the chamber having a contraction formed by two protuberances symmetrically and oppositely arranged on the axis of rotation of the rotating air charge, said protuberances projecting from the walls of the chamber and terminating in substantially pointed ends, to cause such points to be quickly brought to incandescence to provide the necessary ignition temperature.

ENRICO HOCKE.